US006660782B1

(12) United States Patent
Matijega

(10) Patent No.: US 6,660,782 B1
(45) Date of Patent: Dec. 9, 2003

(54) RIGID POLYURETHANE FOAMS AND METHOD TO FORM SAID FOAMS USING LOW MOLECULAR WEIGHT DIOLS AND TRIOLS

(75) Inventor: Roney J. Matijega, Lake Orion, MI (US)

(73) Assignee: Essex Specialty Products, Inc., Auburn Hills, MI (US)

( * ) Notice: Subject to any disclaimer, the term of this patent is extended or adjusted under 35 U.S.C. 154(b) by 520 days.

(21) Appl. No.: 09/064,486

(22) Filed: Apr. 22, 1998

(51) Int. Cl.[7] ............................................. C08G 18/10
(52) U.S. Cl. ..................... 521/130; 521/131; 521/137; 521/170; 521/172; 521/174
(58) Field of Search .................. 521/131, 137, 521/130, 172, 174, 170

(56) References Cited

U.S. PATENT DOCUMENTS

| 5,187,204 A | | 2/1993 | Jackson et al. ............. 521/111 |
| 5,234,965 A | * | 8/1993 | Gott et al. .................. 521/116 |
| 5,688,835 A | * | 11/1997 | Scherbel et al. ............ 521/131 |
| 5,762,822 A | * | 6/1998 | Tucker ..................... 252/182.2 |
| 5,798,533 A | * | 8/1998 | Fishback et al. ........ 252/182.25 |

FOREIGN PATENT DOCUMENTS

| DE | 2 261 545 | 7/1973 |
| EP | 0 542 220 A1 | 5/1993 |
| EP | 0 595 501 A2 | 5/1994 |
| WO | 99/05195 | 2/1999 |
| WO | 99/33893 | 7/1999 |

* cited by examiner

Primary Examiner—John M. Cooney, Jr.

(57) ABSTRACT

The present invention is a polyurethane foam comprising the reaction product of a first reactant comprised of a polyisocyanate having an average isocyanate functionality of at least 2 and a second reactant comprised of a low molecular weight compound that has at least two to, at most, three groups containing an active hydrogen and water, wherein the reaction product is formed essentially in the absence of a cross-linking polyol and the polyurethane foam is substantially rigid. The invention is also a method of forming the polyurethane foam by contacting the first and second reactant for a time and temperature sufficient to form the foam.

24 Claims, No Drawings

RIGID POLYURETHANE FOAMS AND METHOD TO FORM SAID FOAMS USING LOW MOLECULAR WEIGHT DIOLS AND TRIOLS

FIELD OF THE INVENTION

The invention is directed to rigid polyurethane foams and methods for making rigid polyurethane foams.

BACKGROUND OF THE INVENTION

Polyurethane foams are formed by the reaction of a polyisocyanate compound, such as toluene diisocyanate (TDI) and diphenylmethane diisocyanate (MDI) with a polyhydroxyl compound, such as a polyol. Generally, streams of equal volume of the polyol (i.e., polyol side) and polyisocyanate (isocyanate) are intermixed in a mixing head and then injected into a mold where they react to form the polyurethane foam. Generally, the polyol side also contains water, surfactant, catalysts and added blowing agents.

Generally, there are two types of polyurethane foams: flexible and rigid. In general, flexible foams have open cellular structures and a flexible polyurethane (e.g., uses a low functionality; high molecular weight polyol) which allows them to be elastically deformed. Generally, when making a flexible polyurethane foam, water in the polyol side is used as the blowing agent. The water reacts with the isocyanate producing carbon dioxide that foams the polyurethane as the isocyanate and polyol react.

Rigid foams, on the other hand, generally have a substantially closed cellular structure which essentially fails to elastically deform (i.e., when a rigid foam deforms, it deforms permanently). To provide rigidity, rigid polyurethane foams, typically, are formed using a lower molecular weight polyol than used to make a flexible foam and also a cross-linking polyol. Generally, the cross-linking polyol has (1) a hydroxyl functionality of greater than 3 to 8 (i.e., typically greater than 3 to 8 hydroxyl groups/molecule that can react with the isocyanate), (2) a mean molecular weight of 300 to 800 and high viscosity of 3000 to 20,000 centipoise. The cross-linking polyols are typically added to increase the cross-linking density to form a rigid foam of adequate strength and rigidity.

Unfortunately, the use of high viscosity cross-linking polyols generally raises the viscosity of the polyol side substantially. The increased viscosity of the polyol side typically makes it difficult to achieve efficient mixing with the low viscosity isocyanate side, resulting in inhomogeneous rigid foams. Historically, low viscosity, liquid volatile organic compounds (i.e., added liquid blowing agents) have been used to lower the viscosity. However, this results in volatile organic compound (VOC) emissions when making the foam.

The cross-linking polyols also make it difficult to balance the volumes of the isocyanate side and polyol side due to the high equivalent weight of the cross-linking polyol. This is especially true when the polyol side contains water due to its low equivalent weight of 9. Again, the aforementioned volatile organic compounds are generally added to balance the volume of the polyol and isocyanate side and to blow the foam in the absence of water.

In addition, the cross-linking polyols cause the foam to achieve "gel point" sooner than a foam formed without them. Gel point is when the viscosity of the foaming mass begins to rise exponentially due to link up of polymer domains. Thus, rigid foams made with cross-linking polyols tend to split when made with water because of internal gas pressure from the continued evolution of $CO_2$ after the foam has gelled.

Consequently, the blowing agent for a rigid foam generally is either (1) a liquid volatile organic compound, such as chloromethane (e.g., CFM-11), that volatizes during the forming of the polyurethane causing the polyurethane to foam or (2) an gaseous organic compound, such as chloromethane (e.g., CFM-12), that is injected into the streams causing the streams to froth and consequently form the rigid foam. These blowing agents have generally been used to avoid one or more of the problems described above. However, they raise environmental and safety concerns.

Thus, it would be desirable to provide a rigid polyurethane foam that avoids one or more of the problems of the prior art, such as one or more of those described above.

SUMMARY OF THE INVENTION

A first aspect of the present invention is a method for forming a polyurethane foam comprising: contacting a first reactant comprised of a polyisocyanate having an average isocyanate functionality of at least 2 and a second reactant comprised of a low molecular weight compound that has at least two to, at most, three groups containing an active hydrogen in the presence of water for a time sufficient to form a substantially rigid foam, provided the foam is formed essentially in the absence of a cross-linking polyol.

A second aspect of the invention is a polyurethane foam comprising the reaction product of a first reactant comprised of a polyisocyanate having an average isocyanate functionality of at least 2 and a second reactant comprised of a low molecular weight compound that has at least two to, at most, three groups containing an active hydrogen and water, wherein the reaction product is formed essentially in the absence of a cross-linking polyol and the polyurethane foam is substantially rigid. A substantially rigid foam, herein, is a rigid foam as understood in the art. For example, the substantially rigid foam generally has a closed cellular structure which essentially fails to elastically deform (i.e., any deformation of the foam tends to be permanent).

Herein, the cross-linking polyol has a hydroxyl functionality of greater than 3 (i.e., greater than 3 hydroxyl groups/molecule that can react with the isocyanate) and a molecular weight of about 300 to 800. Generally, the cross-linking polyol has a viscosity of 3000 to 20,000 centipoise. The foam formed essentially in the absence of the cross-linking polyol means that only trace amounts are present in the reaction mixture that forms the foam. Preferably there is no cross-linking polyol.

By using a low molecular weight compound, such as propylene glycol, a substantially rigid polyurethane foam may surprisingly be formed in the absence of a cross-linking polyol. The foam may also be formed in the absence of a blowing agent other than $CO_2$ produced from the water-polyisocyanate reaction. It is believed that the low molecular weight compound slows the cross-linking and, consequently, the onset of rigidity of the foam being formed. This slowing is thought to provide a sufficient time for essentially complete evolution of $CO_2$ from the water isocyanate reaction to allow the foam to form without splitting, as occurs, for example, when using the cross-linking polyol described above. In addition, it is also believed that the use of the low molecular weight compound more completely reacts with the isocyanate groups, resulting in foams generally having higher compressive moduli than those made with cross-linking polyols.

In addition, because of the low equivalent weight of the low molecular weight compound, the first aspect of the invention may also be advantageously performed using volumes of the first and second reactants that are similar, even when the second reactant contains an auxiliary polyol, such as a polyether polyol described later while maintaining the isocyanate index near one. Consequently, the method of the first aspect may be performed using standard polyurethane process equipment. The use of the low molecular weight compound having a low viscosity also results in the second reactant (i.e., the polyol side) to have a low viscosity similar to known polyisocyanates. The viscosity similarity allows the two reactants to be easily mixed and reacted to form a more uniform and homogeneous foam.

The method and foams produced according to the present invention may be used in any suitable application, such as those known in the art, including applications involving, for example, automotive applications requiring stiffening, reinforcing, NVH (noise, vibration and harshness) abatement in a vehicle.

DETAILED DESCRIPTION OF THE INVENTION

The method according to this invention contacts a first reactant comprised of a polyisocyanate having a functionality of at least 2 and a second reactant, comprised of a low molecular weight compound, that has at least two to, at most, three groups containing an active hydrogen in the presence of water.

The polyisocyanate may be any polyisocyante suitable for making a polyurethane foam, such as those known in the art. The polyisocyanate may be an aromatic or aliphatic polyisocyanate, polymeric isocyanate, aromatic diisocyanate and aliphatic diisocyanate. Exemplary polyiisocyanates include m-phenylene diisocyanate, tolylene-2-4-diisocyanate, tolylene-2-6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, methoxyphenyl-2,4-diisocyanate, diphenylmethane-4,4,-diisocyanate, 4,4' biphenylene diisocyanate, 3,3' dimethoxy-4,4'-biphenyl diisocyanate, 3,3'-dimethyl-4-4'-biphenyl diisocyanate, 3,3'-dimethyldiphenylmethane-4,4'-diisocyanate, 4,4',4"-triphenyl methane triisocyanate, polymethylene polyphenylisocyanate and tolylene-2,4,6-triisocyanate, 4,4'-dimethyldiphenylmethane-2,2'5,5'-tetraisocyanate. Preferably the polyisocyanate is diphenylmethane-4,4'-diisocyanate (MDI), tolylene-2-4-diisocyanate, tolylene-2-6-diisocyanate or mixtures thereof. Tolylene-2-4-diisocyanate, tolylene-2-6-diisocyanate and mixtures thereof are generically referred to as TDI. More preferably, the polyisocyanate is a polymeric polyisocyanate formed from MDI, such as those available from The Dow Chemical Company under the PAPI™ trade name. The polymeric polyisocyanate "PAPI 27" is particularly preferred.

Generally, the average isocyanate functionality of the polyisocyanate is at least 2 to at most about 6. Preferably the average isocyanate functionality of the polyisocyanate is at least about 2.5 and more preferably at least about 2.7 to preferably at most about 3.5 and more preferably at most about 3.3. As understood in the art, functionality is the average number of isocyanate groups per molecule in the polyisocyanate.

To ensure adequate cross-linking, the low molecular weight compound (LMWC) has a functionality of at least 2 to at most 3, where the functionality is the number of hydroxyl or equivalent hydrogen (e.g., amine) reactive sites per molecule (i.e., the compound has at least two groups containing an active hydrogen). Generally, the groups of the LMWC are an amine, thiol or hydroxyl. The LMWC may be, for example, a diol, dithiol, hydroxy-amine, hydroxy-thiol, amino-thiol or a diamine. The LMWC may be aliphatic or aromatic, aliphatic being preferred. It is preferred that at least one of the groups is a primary group and at least one other group is a secondary group. For example, propylene glycol has one primary hydroxyl and one secondary hydroxyl. The presence of a secondary group is believed to slow the reaction with the isocyanate and, consequently, results in a foam that is easier to form without splitting. The groups of the LMWC are preferably hydroxyl groups. Exemplary LMWCs include propylene glycol, ethylene glycol, 1-4 butanediol, 1-6 hexanediol, resorcinal, hydroquinone, monoethanolamine, glycerin, trimethylolpropane, diethanolamine, triethanolamine, diethylene glycol, dipropylene glycol, neopentyl glycol, hydroquinone bis(2-hydroxyethyl) ether or mixtures thereof. Preferably the LWMC is propylene glycol, ethylene glycol or glycerine. More preferably the LMWC is propylene glycol.

Surprisingly, a substantially rigid foam and adequate cross-linking may be formed when a LMWC having a functionality of less than 3 (e.g., 2) is used in conjunction with a polyisocyanate having a functionality of greater than 2. It is surprising since cross-linking polyols are understood in the art to be compounds having a functionality of more than 3.

The low molecular weight compound must also have a sufficiently low molecular weight to form a substantially rigid polyurethane foam. If the molecular weight is too high, a substantially rigid foam is not formed. Generally, the molecular weight of the LMWC is at most about 200, preferably at most about 150, more preferably at most about 100 to preferably at least about 45.

The amount of LMWC is also important in the formation of a rigid foam. If the amount is insufficient, the foam that is formed may not be rigid. Generally, the amount of LWMC is at least about 2.5 percent by weight of the polyurethane reaction mixture (i.e., all of the components used to make the foam). Preferably the amount of the LWMC is at least about 3 percent, more preferably at least about 5 percent, even more preferably at least about 7.5 percent and most preferably at least about 10 percent by weight of the polyurethane reaction mixture (i.e., all of the components used to make the foam). Generally, these amounts of LMWC correspond to the LWMC comprising at least about 2.5 percent, preferably at least about 6 percent, more preferably at least about 10 percent and most preferably at least about 15 percent by weight of the second reactant.

Even though the second reactant may be entirely composed of the LMWC, it is preferred that the amount is less than 50 percent by weight of the second reactant so that the volume of the first reactant and second reactant may be similar as described herein. Consequently, the second reactant may also contain an auxiliary polyol in addition to the LMWC. Herein, the auxiliary polyol may be a polyol, such as those described by U.S. Pat. Nos. 3,383,351; 3,823,201; 4,119,586 and 4,148,840, each incorporated herein by reference. Exemplary auxiliary polyols include polyhydroxyalkane polyols, polytetrahydrofuran polyols, polyoxyalkylene polyols, alkylene oxide adducts of polyhydroxyalkanes, alkylene oxide adducts of non-reducing sugars and sugar derivitives, alkylene oxide adducts of phosphorus and polyphosphorus acids, alkylene oxide adducts of polyphenols and polyols derived from natural oils, such as caster oil. Preferably the polyols are glycols, triols or higher functionality polyols of poly(oxybutylene), poly(oxyethylene), poly(oxypropylene), poly(oxypropylene-oxyethylene) or mixtures thereof. Generally, these polyols have a molecular weight of at least about 300 MW. The auxiliary polyols used in the instant invention are understood to be incapable of forming a substantially rigid foam in the absence of the LMWC (i.e., they are not cross-linking polyols as described herein). For example, the auxiliary polyol may have an average functionality of greater than 2, but the chain length of the auxiliary polyol is of a length and functionality that fails to cause an amount of cross-linking sufficient to make a substantially rigid foam.

The auxiliary polyol may have a hydroxyl number that varies over a large range depending upon the desired polyurethane foam properties. In general, the auxiliary polyol may have a hydroxyl number that ranges from about 20 to about 1000. Preferably the hydroxyl number is at least about 25, and more preferably at least about 30 to preferably at most about 600, and more preferably at most about 450. The hydroxyl number is defined as the number of milligrams of potassium hydroxide required for the complete hydrolysis of the fully acetylated derivative prepared from 1 gram of polyol.

The method may also be carried out in the presence of catalysts, such as those described by U.S. Pat. No. 4,390,645, at col. 10, lines 14 to 27; surface active agents, such as those described by U.S. Pat. No. 4,390,645, at col. 10, lines 28 to 43; chain extending agents, such as those described by U.S. Pat. No. 4,390,645, at col. 10, lines 59 to 68, and col. 10, lines 1 to 5; fillers, such as calcium carbonate and pigments, such as titanium dioxide, iron oxide, chromium oxide, azo/diazo dyes, phthalocyanines, dioxazines and carbon black, the above relevant portions of U.S. Pat. No. 4,390,645 being incorporated herein by reference. The method may also be carried out in the presence of a flame retardant, such as those known in the art, and may include, for example, phosphorous compounds, halogen containing compounds and melamine.

More specifically, representative catalysts include:

(a) tertiary amines, such as trimethylamine, triethylamine, N-N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo[2,2,2]octane, bis(dimethylaminoethyl)ether and triethylenediamine;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals, such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as $Ti(OR)_4$, $Sn(OR)_4$ and $Al(OR)_9$, wherein R is alkyl or aryl and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate;

(h) organometallic derivatives of tetravalent tin, trivalent and pentavalent As, Sb and Bi and metal carbonyls of iron and cobalt and (i) mixtures thereof. Catalysts are typically used in small amounts, for example, each catalyst being employed from about 0.0015 to about 1 percent by weight of the polyurethane reaction mixture (i.e., all of the components used to make the foam).

Particular examples of surface active agents include nonionic surfactants and wetting agents, such as those prepared by the sequential addition of propylene oxide and then ethylene oxide to propylene glycol, the solid or liquid organosilicones, polyethylene glycol ethers of long chain alcohols, tertiary amine or alkylolamine salt of long chain alkyl acid sulfate esters, alkyl sulfonic ester and alkyl arylsulfonic acids. The surface active agents prepared by the sequential addition of propylene oxide and then ethylene oxide to propylene glycol and the solid or liquid organosilicones are preferred. Liquid organosilicones which are not hydrolyzable are more preferred. Examples of non-hydrolyzable organosilicones include those available under the trademarks "DABCO™ DC 5043," "DABCO™ DC 5169" and "DABCO™ DC 5244," available from Dow Corning Corp., Freeland, Mich. and "TEGOSTAB™ B-8404 and TEGOSTAB™ 8462, available from Th. Goldschmidt Chemical Corp., Hopewell, Va. Surface active agents are typically used in small amounts, for example, from about 0.0015 to about 1 percent by weight of the polyurethane reaction mixture (i.e., all of the components used to make the foam).

When forming the foam, it is preferred that the only blowing agent is essentially the $CO_2$ produced by the water isocyanate reaction. Another blowing agent may be present, such as a low boiling hydrocarbon, such as pentane, hexane, heptane, pentene, and heptene, directly added carbon dioxide, an azo compound, such as azohexahydrobenzodinitrile or a halogenated hydrocarbon, such as dichlorodifluoroethane, vinylidene chloride and methylene chloride. Generally, the amount of these blowing agents is small. Preferably the amount of these blowing agents is at most a trace amount and more preferably none at all (i.e., the only blowing agent is $CO_2$ generated in situ from the water-isocyanate reaction).

The foam may be made by any suitable method, such as those known in the art. The method may include, for example, prepolymer (described in U.S. Pat. No. 4,390,645), one shot (described in U.S. Pat. No. 2,866,744) or frothing (described in U.S. Pat. Nos. 3,755,212; 3,849,156 and 3,821,130), each of the aforementioned patents is incorporated herein by reference.

The first reactant and second reactant are contacted for a time sufficient to form the substantially rigid polyurethane foam without splitting. Generally, the time is as short as practicable and may be from about 1 second to about 60 minutes. The temperature of the reaction may be any sufficient to form the foam without splitting but should not be so great that the polyurethane foam decomposes. Generally, the temperature ranges from room temperature up to about 200° C.

It is preferred, when forming the foam, that the volume of the first reactant and second reactant are similar so that typical polyurethane foaming apparatus may be used. Generally, the volume ratio of the first reactant to the second reactant is at least about 0.7, more preferably at least about 0.8 and most preferably at least about 0.9 to preferably at most about 1.3, more preferably at most about 1.2 and most preferably at most about 1.1. The second reactant, besides containing the LMWC and polyol, may contain, for example, a catalyst, filler, water, flame retardant and surfactant.

Because LMWCs generally have a low viscosity, the present invention enables a more uniform mixing of the first and second reactant than the prior art. Improved mixing provides a more uniform (i.e., more consistent cell size and structure) and homogeneous foam. The viscosity of the second reactant containing the LMWC generally has a viscosity that is within 0.5 to 1.5 times the viscosity of the first reactant (i.e., the polyisocyanate used). Preferably the viscosity of the second reactant is at least about 0.7, more preferably at least about 0.8, and most preferably at least about 0.9 to preferably at most about 1.3, more preferably at most about 1.2 and most preferably at most about 1.1 times the viscosity of the first reactant (i.e., the polyisocyanate).

In the absence of an inert diluent, the apparent visocosity of the second reactant preferably is within a range of about 50 to about 300 centipoise. More preferably the viscosity is at most about 250 centipoise and most preferably at most about 200 centipoise in the absence of an inert diluent. Herein, an inert diluent is a liquid that lowers the viscosity of the second reactant but fails to affect the urethane reaction or react with either hydroxyl or isocyanate groups. Examples of inert diluents may include blowing agents, such as CFCs or plasticizers, such as phthalates.

When forming the foam, the amount of polyisocyanate and, consequently, other reactants used in making polyurethane is commonly given by the isocyanate index. The isocyanate index can be given by the equation:

$$\text{Isocyanate Index} = \frac{\text{Actual amount of isocyanate used}}{\text{Theoretical amount of isocyanate}}$$

The theoretical equivalent amount of isocyanate is the stoichiometric amount of isocyanate required to react with the polyol and any other reactive additives, such as water. The isocyanate index may vary over a wide range, depending on the foam characteristics desired. Generally, a higher index produces a harder foam. In the production of the rigid foams of this invention, the isocyanate index typically ranges from about 0.7 to 1.4. Preferably the index is at least about 0.75, more preferably at least about 0.8, even more preferably at least about 0.85 and most preferably at least about 0.9 to preferably at most about 1.35, more preferably at most about 1.3, even more preferably at most about 1.25 and most preferably at most about 1.2. Large excess in the isocyanate may be used, if it is desired, to make, for example, an isocyanurate foam.

The substantially rigid foam that is formed may have a large range of properties, depending on the particular application that is desired. For example, the foam may have a bulk density of about 5 to about 50 pounds per cubic foot. The foam may also have a wide range of compressive strengths, depending, of course, on the density and particular components used. For example, the foam may have a compressive strength of about 100 to about 5000 pounds per square inch and a compressive modulus of about 2000 to about 100,000 pounds per square inch.

Below are specific examples within the scope of the invention and comparative examples. The specific examples are for illustrative purposes only and in no way limit the invention described herein.

EXAMPLES

Example 1

First a second reactant (i.e., polyol side) is made by mixing together the components shown in Table 1. The components are mixed for about 15 minutes at about 700 rpm using a turbine mixer available from INDCO, New Albany, Ind. The second reactant has a viscosity of about 220 centipoise (cps). Using a Gusmer low pressure impingement dispenser (Gusmer Corp. Akron, Ohio), the second reactant is mixed at about 500 psi and at about 120° F. with about 120 parts by weight (pbw) of PAPI 27 and dispensed into an open container where the mixture forms a foam. PAPI 27 is an MDI polymeric polyisocyanate having an average isocyanate functionality of about 2.7, average molecular weight of about 360 and a viscosity of about 180 cps. PAPI 27 is available from The Dow Chemical Co., Midland, Mich.

The foam formed without splitting. The resultant rigid foam has a free rise density of about 5.4 pounds per cubic foot (pcf) and a compressive strength of 126 pounds per square inch (psi), as determined according to ASTM D-1621, procedure A.

Example 2

The foam of Example 2 is made by the same method described in Example 1 except that the components of the polyol side are different, as shown in Table 1. The amount of PAPI 27 used is 117 pbw and the PAPI 27 and second reactant were mixed by hand for about 15 seconds in the foaming container using the turbine mixer. The foam formed without splitting. The resultant foam has a free rise density of about 1.4 pcf and was dimensionally stable, as determined by measuring the dimensions of a foam sample (2"×2"×1") before and after heating for 15 minutes in a furnace maintained at about 250° F. (120° C.).

Example 3

The foam of Example 3 is made by the same method described in Example 1 except that the components of the polyol side are different, as shown in Table 1, and the amount of PAPI 27 is 116 pbw. The foam formed without splitting. The resultant rigid foam has a free rise density of about 6.7 pcf and compressive strength of about 126 psi.

Comparative Example 1

The foam of Comparative Example 1 is made by the same method described in Example 1 except that the components of the polyol side are different, as shown in Table 2, and the amount of PAPI 27 is 115 pbw. The foam split during formation.

Comparative Example 2

The foam of Comparative Example 1 is made by the same method described in Example 1 except that the components of the polyol side are different, as shown in Table 2, and the amount of PAPI 27 is pbw. The foam split during formation.

TABLE 1

Polyol Side of Examples 1–3

| Component | Component Description | Example 1 (pbw) | Example 2 (pbw) | Example 3 (pbw) |
|---|---|---|---|---|
| VORANOL 235–048 | MW average: 3500 average OH #: 48 glycerin initiated polyether polyol | 30.7 | 25.0 | 30.7 |
| VORANOL 270 | MW average: 700 average OH #: glycerin initiated polyether polyol | 44.0 | 52.1 | 50.0 |
| Propylene Glycol | Not Applicable | 21.0 | 10.0 | 0 |
| Glycerin | Not Applicable | 0 | 0 | 15.0 |
| Water | Not Applicable | 1.0 | 5.0 | 1.0 |
| DEH 39 | aminoethylpiperizine | 0 | 2.0 | 0 |
| POLYCAT 5 | Pentamethyl-diethylene triamine | 0.9 | 0 | 0.9 |
| POLYCAT 8 | N,N-dimethyl cyclohexylamine | 0.9 | 0 | 0.9 |
| DABCO 33 LV | 33% Triethylene diamine in dipropylene glycol | 0 | 1.0 | 0 |
| DABCO BL-11 | 70% Bis (N,N-dimethylaminoethyl ether in dipropylene glycol | 0 | 1.0 | 0 |
| DABCO DMEA | N,N'dimethylethanolamine | 0 | 0.9 | 0 |
| Phenothiazine | Not Applicable | 0.5 | 0 | 0.5 |
| TEGOSTAB B-8404 | organosilicone | 1.0 | 3.0 | 1.0 |

VORANOLs and DEH 39 available from The Dow Chemical Co., Midland, MI.
POLYCAT and DABCO products available from Air Products and Chemical Inc, Allentown, PA.
TEGOSTAB B-8404 available from Th. Goldshmidt Co., Hopewell, VA.

TABLE 2

Polyol Side of Comparative Examples

| Component | Component Description | Comp. Example 1 (pbw) | Comp. Example 2 (pbw) |
|---|---|---|---|
| VORANOL 390/391 | MW average: 575 average OH #: 390 toluene diamine initiated polyether polyol | 40.0 | 40.0 |
| VORANOL 270 | MW average: average OH #: glycerin initiated polyether polyol | 46.4 | |
| VORANOL 232–034 | MW average: average OH #: glycerin initiated polyether polyol | | 48.9 |
| Glycerin | Not Applicable | 10.0 | 0 |
| Propylene Glycol | Not Applicable | | 6.0 |
| Water | Not Applicable | 0.3 | 0.8 |
| CURITHANE 52 | 50% by weight metal carboxylate in diethylene glycol | 0 | 0.5 |
| POLYCAT 5 | Pentamethyl-diethylene triamine | 0.9 | 0.3 |
| POLYCAT 8 | N,N-dimethyl cyclohexylamine | 0.9 | 0.5 |
| Phenothiazine | Not Applicable | 0.5 | 0 |
| TEGOSTAB B-8404 | organosilicone | 1.0 | 1.0 |

VORANOLs available from The Dow Chemical Co., Midland, MI.
POLYCAT and DABCO products available from Air Products and Chemical Inc.
TEGOSTAB B-8404 available from Th. Goldshmidt Co.

From Examples 1 and 2 a rigid foam may be formed in the absence of a cross-linking polyol and in the absence of a blowing agent other than $CO_2$ generated in situ. Whereas, foams of Comparative Examples 1 and 2 that employ a cross-linking polyol split.

What is claimed is:

1. A method for forming a polyurethane foam comprising: contacting a first reactant comprised of a polyisocyanate having an average isocyanate functionality of at least 2 and a second reactant comprised of a low molecular weight compound that has at least two to, at most, three groups containing an active hydrogen in the presence of water for a time sufficient to form a substantially rigid foam wherein at least one of the active hydrogen containing groups is a primary active hydrogen containing group and at least one other active hydrogen containing group is a secondary active hydrogen containing group, provided the foam is formed essentially in the absence of a cross-linking polyol having a hydroxyl functionality greater than 3.

2. The method of claim 1 wherein the low molecular weight compound has a molecular weight of less than 200 MW.

3. The method of claim 1 wherein the groups of the low molecular weight compound are selected from the group consisting of an amine, thiol and hydroxyl.

4. The method of claim 1 wherein the low molecular weight compound has two groups containing an active hydrogen and the polyisocyanate has a functionality of greater than two.

5. The method of claim 4 wherein the groups are selected from the group consisting of an amine, thiol and hydroxyl.

6. The method of claim 4 wherein the low molecular weight compound is a diol, dithiol, hydroxy-amine, hydroxy-thiol, amino-thiol or diamine.

7. The method of claim 6 wherein the low molecular weight compound is a diol, diamine or dithiol.

8. The method of claim 4 wherein the average isocyanate funtionality of the polyisocyanate is about 2.5 to 3.5.

9. The method of claim 8 wherein the average isocyanate funtionality is about 2.7 to 3.3.

10. The method of claim 1 wherein the low molecular weight compound is propylene glycol, ethylene glycol, 1-4 butanediol, 1-6 hexanediol, resorciol, hydroquinone, monoethaolamine, glycerin, trimethylolpropane, diethanolamine, triethanolamine, pentaerythritol or mixtures thereof.

11. The method of claim 10 wherein the low molecular weight compound is propylene gycol, ethylene glycol or glycerine.

12. The method of claim 11 wherein the low molecular weight compound is propylene glycol.

13. The method of claim 10 wherein the volume ratio is from about is 0.8 to 1.2.

14. The method of claim 1 wherein the first reactant and the second reactant are contacted at a volume ratio of the first reactant to the second reactant of from about 0.7 to 1.3.

15. The method of claim 1 wherein the second reactant is further comprised of an auxiliary polyol.

16. The method of claim 15 wherein at least 10 percent by weight of the second reactant is the low molecular weight compound.

17. The method of claim 16 wherein the amount is at least about 15 percent by weight of the second reactant.

18. The method of claim 1 wherein the method is performed essentially in the absence of a blowing agent other than $CO_2$ produced in situ.

19. A polyurethane foam made by the method of claim 1.

20. A polyurethane foam comprising the reaction product of a first reactant comprised of a polisocyanate having an average isocyanate functionality of at least 2 and a second reactant comprised of a low molecular weight compound that has at least two to, at most, three groups containing an active hydrogen and water wherein at least one of the active hydrogen containing groups is a primary active hydrogen containing group and at least one other hydrogen containing group is a secondary active hydrogen containing group, wherein the reaction product is formed essentially in the absence of a cross-linking polyol and the polyurethane foam is substantially rigid.

21. The foam of claim 20 wherein the reaction product is formed essentially in the absence of a blowing agent other than $CO_2$ formed in situ.

22. The foam of claim 20 wherein the low molecular weight compound is propylene glycol, ethylene glycol, 1-4 butanediol, 1-6 hexanediol, resorcinol, hydroquinone or monoethanolamine.

23. The foam of claim 22 wherein the low molecular weight compound is propylene glycol.

24. The method of claim 1 wherein the low molecular weight compound has a molecular weight of about 150 or less.

* * * * *